United States Patent [19]
Timbs

[11] 3,845,463
[45] Oct. 29, 1974

[54] ULTRASONIC TESTING APPARATUS

[75] Inventor: Arthur Edwards Timbs, Flixton, England

[73] Assignee: United Kingdom Atomic Energy Authority, London, England

[22] Filed: Jan. 15, 1973

[21] Appl. No.: 323,967

[30] Foreign Application Priority Data
Jan. 27, 1972 Great Britain...................... 3879/72

[52] U.S. Cl............................... 340/5 R, 73/67.8 S
[51] Int. Cl.............................................. G01s 7/52
[58] Field of Search.............. 73/67.8 R, 67.8 S, 69, 73/71.5 R, 71.5 US; 340/1 R, 3 R, 5 R, 8 R, 8 S

[56] References Cited
UNITED STATES PATENTS
3,159,023  12/1964  Steinbrecher.................... 73/67.8 S
3,553,638  1/1971  Sublett................................ 340/8 S

*Primary Examiner*—Richard A. Farley
*Attorney, Agent, or Firm*—Larson, Taylor & Hinds

[57] ABSTRACT

A scanning unit for moving an ultrasonic wave transmitting/receiving head has means for moving the head linearly and means for swinging the head so that a series of linear scans can be performed with the head swung at differing angles for each scan. Utilization of the received signals may be to give a "B-scan" presentation on a bi-stable storage tube. The unit is preferable immersible in water and has one important application for the ultrasonic inspection of nuclear reactor pressure vessels.

4 Claims, 3 Drawing Figures

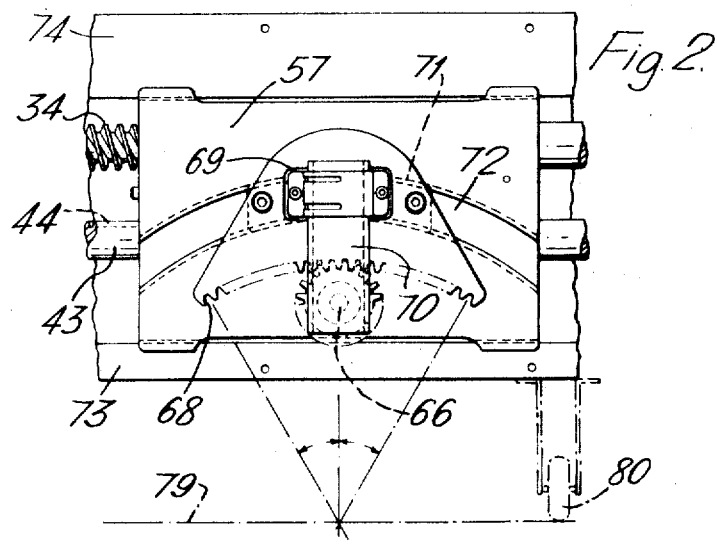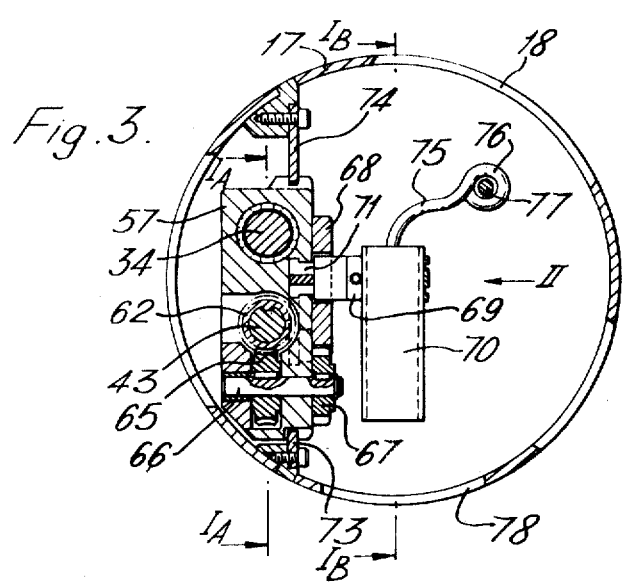

3,845,463

ULTRASONIC TESTING APPARATUS

BACKGROUND OF THE INVENTION

This invention relates to ultrasonic testing apparatus.

It is known to detect discontinuities in the body of an article by scanning it with a ultrasonic wave transmitting/receiving head. One technique of scanning is known as B-scan. This involves using an ultrasonic wave transmitting and receiving head which makes a linear scan and the receiver echos from discontinuities and changes of medium are used to produce a cathode ray tube display in which the horizontal time base corresponds to the length of the scan and the vertical presentation is in the form of light intensified points which are representative of the distance of discontinuities in the body, or of surfaces of the body, from the wave-transmitting head. In effect, the scan reproduces a cross-section of the body or article scanned with the surfaces of the article and any discontinuities appearing as highlighted areas. Such a presentation is attractive in that it does not require a high degree of expertise for interpretation and it is capable of being copied into a "store" such as by photographing of the cathode ray tube trace or making a scan of the tube with a light sensitive cell and recording the cell output on "Teledeltos" paper.

Preferably a B-scan system involves transmitting ultrasonic waves into an article being tested in two modes: the "compression mode," where the waves enters the article normal to the point of application of the waves, and the "shear mode," where the waves enter the article with inclination from the normal. Echos received from both modes are superimposed after being suitably compensated and resolved electrically to take into account the different character of the modes and this produces, on the cathode-ray tube, a presentation which displays the shape, in section, of the discontinuities and also intensifies them visually.

SUMMARY OF THE INVENTION

The present invention is concerned with providing an improved scanning unit for an ultrasonic wave transmitting/receiving head which allows a B-scan presentation to be generated with a high degree of accuracy and versatility.

According to the present invention, a scanning unit for an ultrasonic wave transmitting/receiving head has means for effecting a linear scan of said head along the surface of an article and means for swinging said head so that a range of incidence angles can be created between the surface of the article and the transmitted/received waves.

The scanning unit may comprise a watertight compartment and an elongate water-floodable structure separated, by a watertight barrier through which extend two sealed drive members, from driving means in said compartment, one drive member being coupled to drive a lead screw and the other coupled to drive a keying shaft, a carriage engaging the lead screw for moving the carriage longitudinally in the water-floodable structure, means on the carriage keying with the keying shaft and arranged so that rotation of the keying shaft effects swinging of an ultrasonic wave transmitting-/receiving head mounted on said carriage so that it can transmit/receive ultrasonic waves in the compression and shear modes from/to the water floodable structure to/from the said article.

DESCRIPTION OF THE DRAWINGS

One form of the invention will now be described with reference to the accompanying drawing wherein:

FIG. 2 is an elevation in the direction of arrow II of FIG. 3, and

FIG. 3 is a section on the line III—III of FIG. 1.

DESCRIPTION OF THE PREFERRED EMBODIMENT

Figure 1:
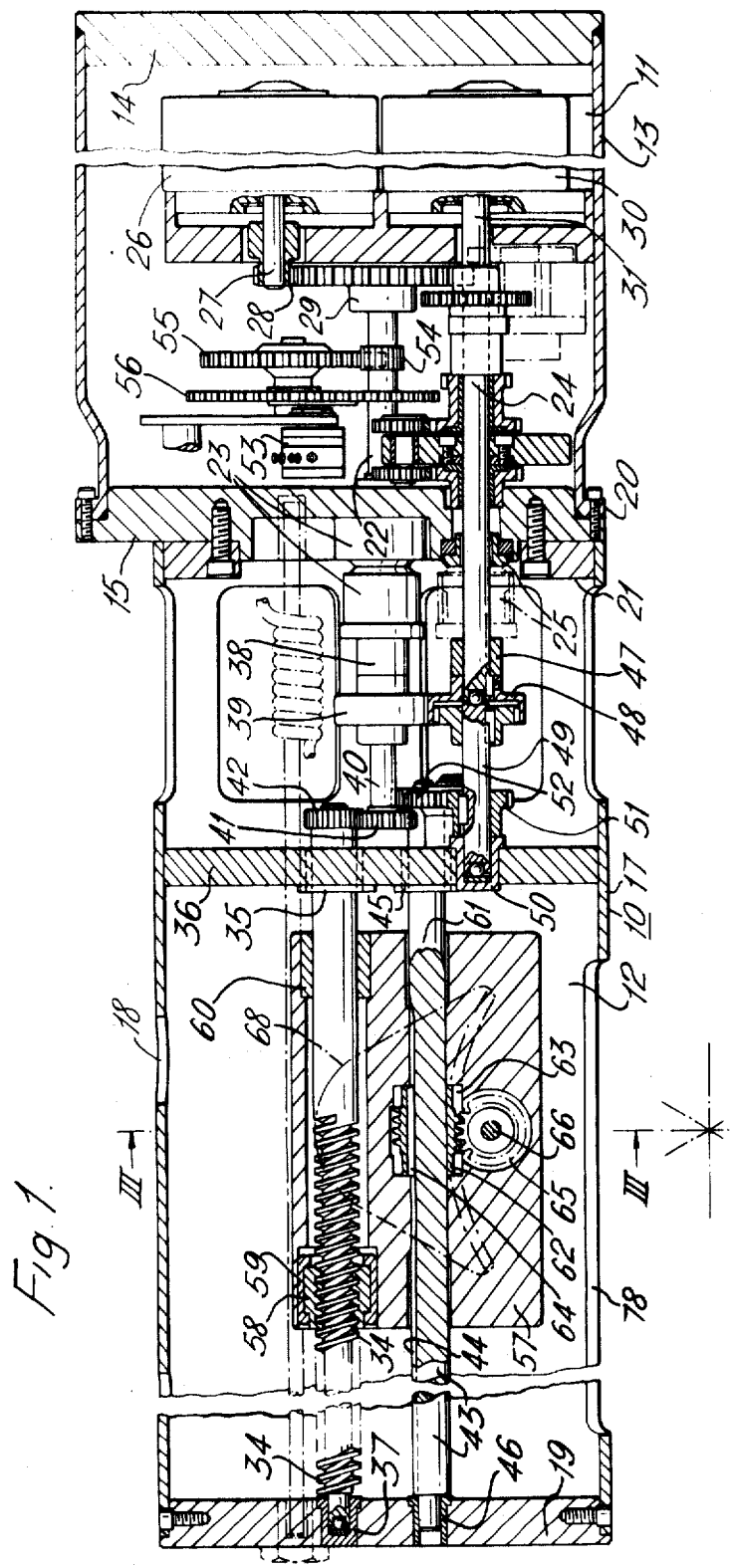
FIG. 1 is a sectional elevation of a composite nature, the right and left hand extremities being taken on the line $I_B$—$I_B$ in FIG. 3 and at the center region taken on the line $I_A$—$I_A$ of FIG. 3.

An elongate body member 10 has a water-tight compartment 11, defined by a cylindrical wall 13, end plate 14 and a barrier 15, and an elongate water floodable compartment 12 defined by a cylindrical wall 17 having apertures 18, end plate 19 and barrier 15. The wall 13 is secured to the barrier 15 at flanges 20 and the wall 17 is secured to the barrier 15 at flanges 21. Two sealed drive members are taken through the barrier 15: one is a lead screw drive member 22 with mechanical shaft seal 23, and the other is a keying shaft drive member 24, with mechanical shaft seal 25. The drive to the drive member 22 is from an electric motor 26 by motor shaft 27, pinion 28 and gear 29. The drive to the drive member 24 is from an electric motor 30 and motor shaft 31. In fact a reduction gear is interposed between shaft 31 and drive member 24 but to avoid complicating the drawing at this point, this has not been shown. A lead screw 34 is shown in a bearing 35 in a bearing plate 36 and in a bearing 37 in the plate 19. The drive between the drive member 22 and the lead screw 34 is by way of a spacer 38, a coupling 39, a shaft 40, a gear 41 and pinion 42.

A keying shaft 43 having a longitudinal keyway 44 is shown in a bearing 45 in the bearing plate 36 and in a bearing 46 in the plate 19. The drive between drive member 24 and the shaft 43 is by way of a spacer 47, a coupling 48, a shaft 49 terminating at a bearing 50, and pinions 51 and 52. Both members 22 and 24 are coupled to drive potentiometers to produce respectively signals representative of the position of a carriage 57 on the lead screw 34 and the degree of swing of a wave-transmitting head 70 mounted on the carriage and actuated by the keying shaft 43. The drive to the lead screw potentiometer 53 only is shown. This comprises a pinion 54 on the shaft 22 driving a gear 55 which is connected to drive (via gears in front of the section of FIG. 1) a potentiometer gear 56. Again to avoid complicating the drawing various support brackets for the potentiometer and intermediate gears and pinions are not shown.

The carriage 57 has, in its "forward" regions (that is the left hand side as viewed in FIG. 1), a nut 58 engaging the lead screw 34, the nut being held in a housing 59, and, in its "rearward" regions, a bearing 60 on the lead screw. The carriage 57 has a longitudinal bore 61 through which the keying shaft 43 passes parallel to the lead screw. A worm 62 is captive in a cavity 63 in the carriage 57 and the worm has a longitudinal key 64 keying with the keyway 44 of the keying shaft 43 so that on rotation of the shaft 43 the worm 62 rotates and on longitudinal movement of the carriage the worm 62 moves with the carriage by the key 64 sliding in the keyway 44. Both rotary and longitudinal movement of the worm 62 can take place at the same time. The worm 62 engages a worm gear 65 keyed to a shaft 66 having a pinion 67 (FIG. 3). The pinion 67 meshes with an arcuate rack 68 to which is fixed, by bracket 69, an ultrasonic wave transmit/receive head 70. The rack 68 is seen to be hump-shaped and it has secured to it an arcuate slide block 71 which moves in an arcuate slot or groove 72 in the carriage 57.

The carriage 57 is guided longitudinally by guide bars 73, 74 (FIG. 3). Electrical connection to the head 70 is by way of a flexible cable 75 which is preformed as a helix 76 that can slide on a guide rod 77. The head 70 transmits/receives through a longitudinal slit 78 in the wall 17 of the water-floodable compartment 12.

In operation to test an article, the upper surface of which is represented by numeral 79 in FIG. 2, the article is secured in a tank and the scanning unit is located by spacer pegs or support brackets on the article so that the surface 79 of the article is truly parallel to the lead screw 34. Electrical connections from the potentiometers, the electric motors 26, 30 and the head 70 are taken to control compensation, resolution and presentation circuits. Presentation is preferably to a bistable storage tube with a video tape recording unit.

The article and the scanning unit are then immersed by filling the tank with water. The carriage 57 is reciprocated, by sending signals to the motor 26, along the compartment 12 by an amount governed by the length of the article to be scanned. During movement each way the head 70 transmits and receives. At the end of the stroke and during angle changing the head ceases to transmit. After each reciprocation the head is swung by one predetermined step until, after a number of reciprocations, the angular traverse of 30° on both sides of the vertical position (as shown in FIG. 2) is completed. The swinging of the head is carried out by sending signals to motor 30 which causes rotation of the shaft 43, rotation of worm 62, gear 65, pinion 67 and rack 68. In order to avoid "blurring" between the compression mode (head 70 vertical) and the shear mode (head 70 inclined to the vertical), the first step in the swinging of the head 70 away from the vertical position is a substantial step and subsequent steps are of a smaller size.

In an alternative method of operation, the article to be inspected could be a large static body, such as a nuclear reactor pressure vessel, which can itself be filled with water and the scanning unit is immersed in this water. The body member 10 is then provided with wheels, say four wheels located at the corners of a rectangle, so that it can also be moved over the wall or the inlet and outlet nozzles of the pressure vessel. FIG. 2 is shown with wheels 80 diagrammatically represented.

The scanning unit can be operated in any orientation and, should rather unusually circumstances require it, could be operated in a medium other than water. Provision can be made for an irrigation supply of water to sweep over the article in the region to be examined to prevent any bubble formation.

In a modified arrangement, the compartment 12 could have, instead of an apertured wall 17, tie bars connecting together plates 19 and 15.

In an alternative form of the invention the shaft 43 carries a tube which is externally threaded and internally has a key to engage the keyway 44 like worm 62 described above. The externally threaded tube engages, at its thread, with a nut. The nut is formed as one slide part of a slide block, the other part of the block having pegs which extend through a pair of slots, like slot 72, in the carriage 57 and carry the ultrasonic head. The pegs also each carry a pair of roller bearings which run in a slot 72. With this form of the invention the rotation of shaft 43 causes rotation of the threaded tube and hence movement of its nut in the axial direction of the shaft 43 which, via the slide, moves rollers in the slots 72 and causes the head to swing.

I claim:

1. A scanning unit for an ultrasonic wave transmitting/receiving head comprising:
   a. a watertight compartment,
   b. an elongate water-floodable structure attached to the watertight compartment,
   c. drive means in the watertight compartment with drive shafts extending through the watertight compartment into the water-floodable structure,
   d. a carriage movable along said structure by rotation of one of said drive shafts,
   e. an ultrasonic wave transmitting receiving head on said carriage,
   f. a swingable mounting for said head on said carriage, and
   g. means coupling another of said drive shafts with said swingable mounting so that rotation of that drive shaft causes the head to swing on the carriage, whereby said head can be scanned linearly along the unit and optionally swung predetermined amounts to transmit/receive waves in the compression mode or in the shear mode at various angles.

2. A scanning unit as claimed in claim 1 having wheels to space the unit from a surface on which the wheels can run to provide a scanning movement of the unit as a whole in a direction transverse to the elongate axis of the unit.

3. A scanning unit as claimed in claim 1 in which the drive shaft for moving the carriage is a lead screw and the carriage has a nut movable on that lead screw.

4. A scanning unit as claimed in claim 1 wherein the means coupling another of said drive shafts with said swingable mounting comprises:
   a rotatable keying shaft coupled to said other of said drive shafts,
   a worm rotatably captive in the carriage and longitudinally slidable along the keying shaft, said worm being constrained to rotate with the keying shaft, a shaft rotatable on a longitudinal axis perpendicular to the keying shaft,
   a worm gear complementary to said worm and secured to the shaft, and
   a pinion secured to said shaft,
   said swingable mounting having an arcuate gear rack complementary to the pinion.

* * * * *